United States Patent [19]
VanderKuyl et al.

[11] Patent Number: 5,951,091
[45] Date of Patent: Sep. 14, 1999

[54] ADJUSTABLE VISOR

[75] Inventors: Paul T. VanderKuyl, Holland; Michael E. Phillips, Wyoming; Paul A. Pham, Holland, all of Mich.

[73] Assignee: Prince Corporation, Holland, Mich.

[21] Appl. No.: 09/081,464

[22] Filed: May 19, 1998

[51] Int. Cl.⁶ ........................................................ B60J 3/00
[52] U.S. Cl. .................................................... 296/97.8
[58] Field of Search ............................................. 296/97.8

[56] References Cited

U.S. PATENT DOCUMENTS

| | | |
|---|---|---|
| 2,261,881 | 11/1941 | Horstmann . |
| 2,492,074 | 12/1949 | Thompson . |
| 2,517,872 | 8/1950 | Hamel . |
| 2,823,950 | 2/1958 | Harris . |
| 3,499,679 | 3/1970 | Olander . |
| 3,610,088 | 10/1971 | Christensen et al. . |
| 3,649,068 | 3/1972 | Moynihan . |
| 4,792,176 | 12/1988 | Karford ................................. 296/97.8 |
| 4,828,314 | 5/1989 | Gavagan ............................... 296/97.8 |
| 5,042,867 | 8/1991 | Crotty et al. ......................... 296/97.8 |
| 5,071,186 | 12/1991 | Hemmeke et al. . |
| 5,104,174 | 4/1992 | Gute ..................................... 296/97.8 |
| 5,156,434 | 10/1992 | Vandagriff ............................ 296/97.8 |
| 5,316,361 | 5/1994 | Miller .................................... 296/97.8 |
| 5,365,416 | 11/1994 | Peterson ............................... 296/97.8 |
| 5,445,427 | 8/1995 | Vandagriff ............................ 296/97.8 |
| 5,749,618 | 5/1998 | Jones .................................... 296/97.8 |

*Primary Examiner*—Gary C. Hoge
*Attorney, Agent, or Firm*—Price, Heneveld, Cooper, DeWitt & Litton

[57] ABSTRACT

A visor body is made of a polymeric material and includes a guide track formed therein for slidably holding an extendable panel comprising a polymeric core shaped to interface with said guide of said visor body. The core is covered by upholstery material to conform to the interior of a vehicle. In a preferred embodiment of the invention, the extendable panel is laminated utilizing a PET core, a sheet of film adhesive on opposite sides thereof and upholstery material. In a preferred embodiment also, the guide means of the visor body comprises a pair of opposed facing open channels for receiving the auxiliary panel which has a peripheral edge with a reduced thickness for extending into the channels to allow sliding movement between the fabric-to-plastic interface between the extendable panel and the visor body. Such construction is relatively inexpensive and provides a quiet, smooth sliding visor assembly with an improved finished appearance to the vehicle interior.

23 Claims, 2 Drawing Sheets

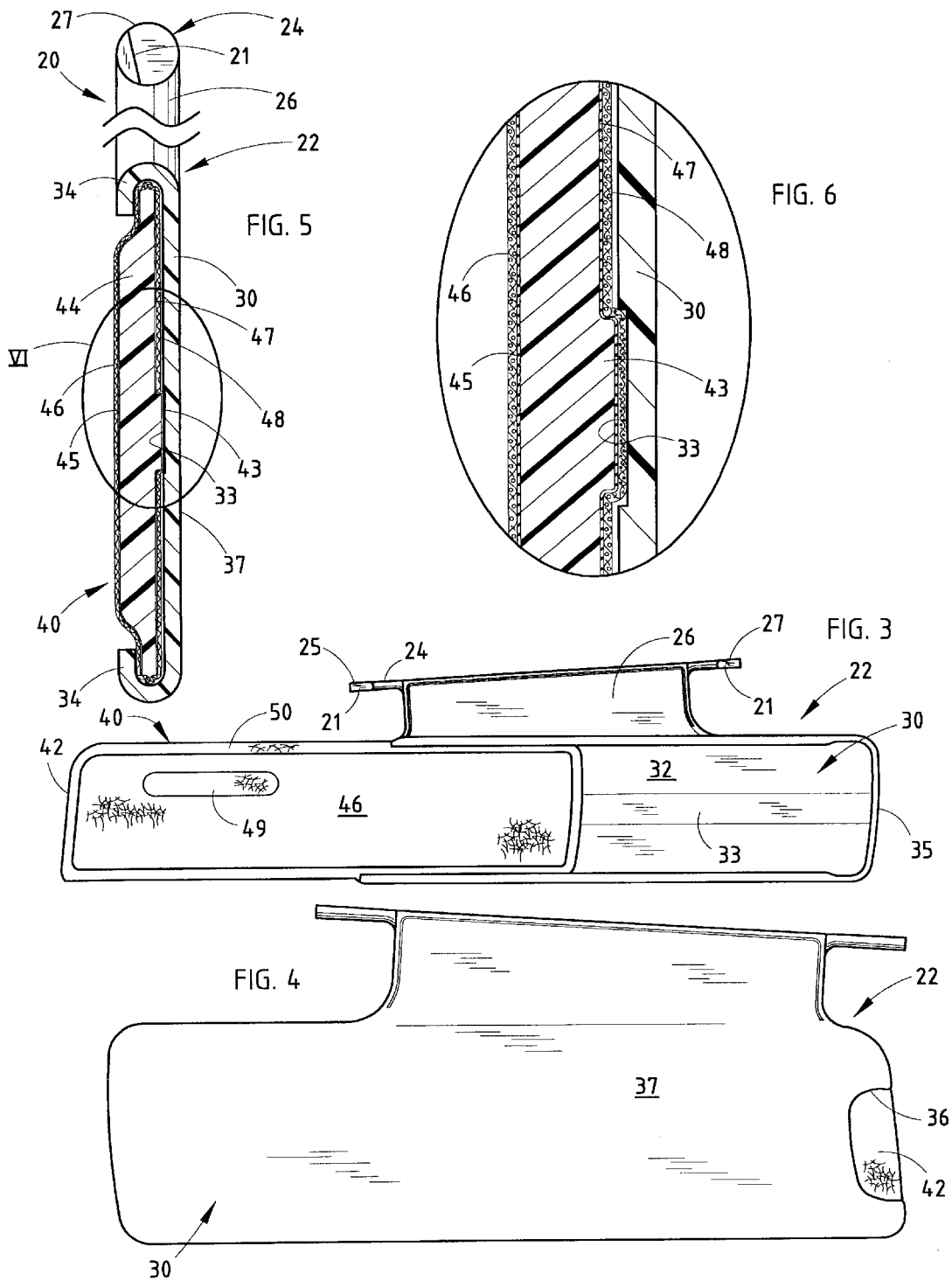

ADJUSTABLE VISOR

BACKGROUND OF THE INVENTION

The present invention relates to vehicle visors and particularly to a visor which includes a movable panel for adjustment.

Vehicle visors are mounted such that they can pivot between a raised stored position adjacent the vehicle headliner and a lowered use position. They typically also can pivot to a side window position, allowing the user to block incident sunlight from the side. In order to provide simultaneous side and front window shade, visor systems have been proposed which employ a primary conventional visor and a secondary or auxiliary visor. U.S. Pat. Nos. 2,261,881; 2,492,074; 2,517,872; 2,823,950; 3,499,679; and 5,071,186 are representative of such structure. In these systems, an auxiliary visor is provided, typically coupled to the primary visor through a pivot connection such that it can be moved to a variety of locations for providing sun blocking along more than one axis of incident sunlight. Some prior art suggests providing conventional visors with sliding sleeves for blocking sunlight. U.S. Pat. Nos. 3,610,088 and 3,649,068 are representative of this "add-on" approach. The add-on visor extenders, although being useful for extending the width of existing visors, do not provide a finished appearance to an automobile which is acceptable for modern vehicle interior design. Frequently, such devices clip-on utilizing unsightly clips which would also not pass vehicle safety standards and could not be provided as original equipment for such reason.

The visor system disclosed in U.S. Pat. No. 5,071,186 provides a visor installation which includes a pair of visors, one of which is mounted between fixed mounting brackets and is made of a polymeric material and can integrally include a sliding extension mounted thereto. The visor body and extension are both made of the same polymeric material and are interlocked to hold the sliding panel in place and yet allow it to move along the longitudinal axis of the visor body. Unfortunately with such construction, the polymeric mating visor blades, if mounted sufficiently loosely to allow easy sliding movement, can cause annoying rattling or other noise when the vehicle is traveling along rough terrain. With an emphasis on passenger comfort and quietness in the passenger compartment of a vehicle, such a problem becomes significant and frequently is solved utilizing soft pads or the like at locations along the visor bodies to minimize such noise. These after-design "fixes," however, add to the cost of a visor and interfere with the sliding motion desired. Thus, there remains a need for a visor having an extendable panel which provides the desired sliding action and yet is relatively noiseless and one which further can provide a high quality appearance for a vehicle interior.

SUMMARY OF THE PRESENT INVENTION

The visor of the present invention solves the need for a visor having an extendable panel and one which has an appearance which aesthetically compliments the vehicle interior. Further, the visor system of the present invention provides a rattle-free, smooth sliding feel which allows ease of operation without contributing unwanted noises to the vehicle. Visor systems embodying the present invention comprise a visor body made of a polymeric material and include a guide track formed therein for captively holding an extendable panel and an extendable panel comprising a polymeric core shaped to interface with said guide track of said visor body. The core of the extendable panel is at least partially covered by upholstery material. In a preferred embodiment of the invention, the visor body is made of an ABS material, while the core of the extendable panel is made from PET material with an upholstered surface conforming to the interior of the vehicle. The extendable panel is laminated in one embodiment utilizing a PET core, a sheet of film adhesive on opposite sides thereof and upholstery material. In a preferred embodiment also, the guide means of the visor body comprises a pair of opposed facing open channels for receiving the extendable panel which has edges with a reduced thickness for extending into said channels to allow sliding movement between said extendable panel and the visor body. Such construction is relatively inexpensive and provides a quiet, smooth sliding visor assembly with an improved finished appearance to the vehicle interior.

These and other features, objects and advantages of the present invention will best be understood by reference to the following description together with reference to the accompanying drawings.

BRIEF DESCRIPTION OF THE DRAWINGS

FIG. 3 is a reduced front elevational view of the visor shown in FIG. 2, shown in a second operative position;

FIG. 4 is a rear elevational view of the visor shown in FIGS. 1–3;

FIG. 5 is an enlarged vertical cross-sectional view taken along section line V—V of FIG. 2; and FIG. 6 is a greatly enlarged view of the circled area VI in FIG. 5.

DETAILED DESCRIPTION OF THE PREFERRED EMBODIMENT

Figure 1:
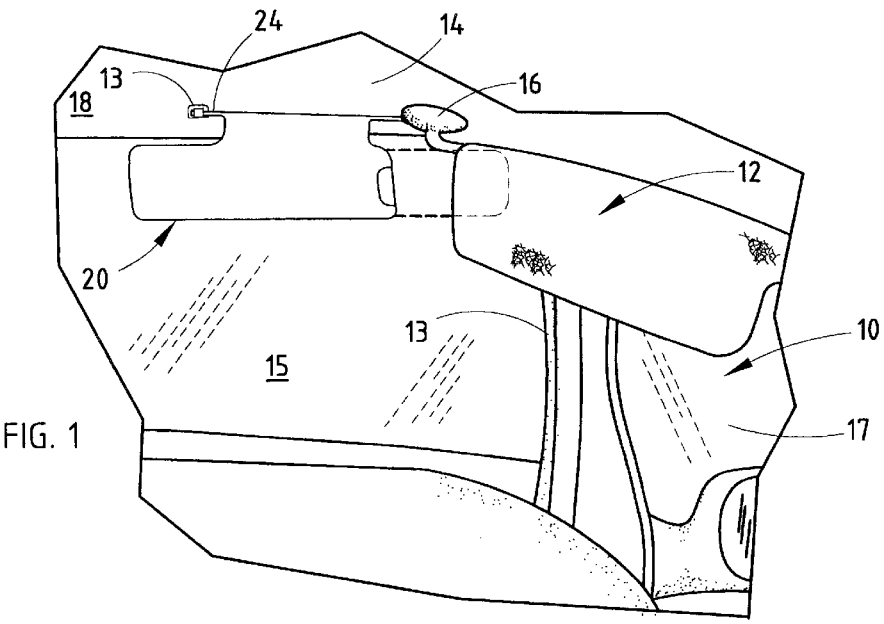
FIG. 1 is a fragmentary perspective view of a vehicle having a visor system embodying the present invention.

Referring initially to FIG. 1, there is shown a visor installation for the passenger side of a vehicle 10, such as an automobile. The visor installation includes a conventional main visor 12 mounted to the vehicle roof 14 by a pivot mounting bracket 16, allowing the visor to move between a raised stored position against the vehicle headliner 18 covering the roof 14, a lowered use position in the front windshield 15 position, or a side window position, as shown in FIG. 1, blocking incident light from the side window 17. An A-pillar 13 extends between the windshield 15 and side window 17, as seen in FIG. 1. The visor system further includes an adjustable secondary visor 20 of the present invention which includes a polymeric visor body 22 having an integrally formed visor pivot rod 24 extending along the top edge thereof with ends 25 and 27 which are rotatably mounted within visor mounting brackets 13 and 16, respectively. The mounting brackets can be substantially the same as those disclosed in U.S. Pat. No. 5,071,186 to include torque springs for the snap-up control of visor 20 between a lowered use position, as shown in FIG. 1, and a raised stored position against the vehicle headliner 18. For such purpose, each of the ends 25, 27 of the visor pivot rod 24 include a flat 21 (FIG. 2) forming a detent selectively engaging the torque springs. Slidably mounted within the visor body 22 is an extendable panel 40 mounted to the visor body 22 as described in greater detail below.

Figure 2:
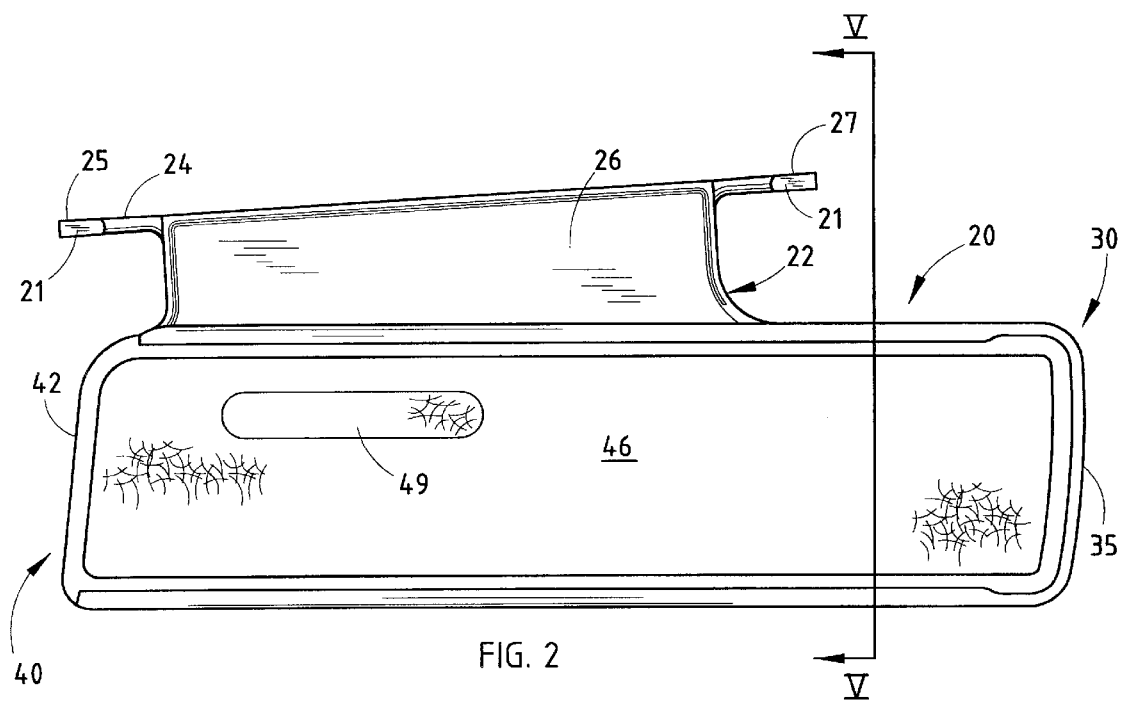
FIG. 2 is an enlarged front elevational view of the visor of the present invention, shown in a first operative position.

Visor body 22 comprises a generally rectangular visor panel 30, which is integrally coupled to pivot rod 24 by a generally trapezoidal, integrally molded flange 26 to position the panel 30 generally in parallel relationship to the upper edge of windshield 15, as seen in FIG. 1, for a given vehicle design. Flange 26, thus, will have a shape selected for a given vehicle to provide such alignment. The visor body 22, including the main visor panel 30, is integrally molded of a polymeric material, such as ABS, and has a rearward facing surface 32 when in a lowered position, as seen in FIG. 3, with a longitudinally extending centrally aligned recess 33 (FIGS. 3, 5 and 6) for guidably receiving a longitudinally extending rib 43 (FIGS. 5 and 6) on extendable panel 40. Surrounding three sides of the periphery of visor panel 30 is an integrally molded, generally U-shaped channel 34 which, as best seen in FIG. 5, captively receives opposites edges of the extendable panel 40. End 35 of visor panel 30 is enclosed with channel 34, as seen in the preferred embodiment, such that the extendable panel 40 is nestably received in channel 34 including end section 35, as best seen in FIG. 2. Panel 40 slides in channel 34 outwardly toward the A-pillar or center of the vehicle, as seen in phantom form in FIG. 1 and in FIG. 3. If desired, end section 35 can be removed to allow the extendable panel 40 to move laterally to the left or right of the visor body 22. The recess 33 and rib 43 may include interlocking tabs to allow the extendable panel 40 to be inserted within channel 34 and subsequently prevent panel 40 from being fully withdrawn. Such tabs (not shown) may conventionally include inclined ramps to allow insertion of the panel 40 but subsequently prevent inadvertent removal while allowing a full range of adjustment.

Panel 30 includes a slot 36 (FIG. 4) extending through the rear surface 37 to provide a hand grip for the edge 42 of visor extension 40, allowing it to be withdrawn from the visor body 22 for adjustment. The extendable panel 40 is preferably made of a polyethylene terephthalate material (PET) core 44 having a body thickness in the preferred embodiment of from about 1/8 to 1/4 inch. The extendable panel 40 is formed by laminating, to opposite sides of the core 44, sheets 45 and 47 of thermally activated film adhesives (FIGS. 5 and 6) overlaid by layers of upholstery material 46 and 48, which are bonded to the opposite surfaces of the core during manufacture of the core. The upholstery material 46 and 48 can be a woven fabric, vinyl, leather or other suitable covering material. In addition, instead of laminating the upholstery material with double adhesive film layers, it may also be possible to flock upholstery fibers directly onto the underlying core 44 utilizing a commercially known flocking process.

The peripheral edge 50 of extendable panel 40 is reduced in thickness during the pressing laminating process to define a narrowed peripheral border which, as seen in FIG. 5, fits within the U-shaped channel 34 of the main visor body 30. This construction minimizes the overall thickness of the visor 20 with the channel 34 having a width of about 1/10 inch such that the fabric layers 46, 48 in the body 50 slide, rattle free, within the channel 34. The thickness of border 50 is slightly less than 1/10 inch and in the preferred embodiment was about 3/32 inch.

Extendable panel 40 can be manufactured by utilizing a sheet of PET material, laminating the sheet with the film and upholstery on opposite sides, heating the laminate, and subsequently pressing and trimming the edges of the laminated sheet into the shape of the visor panel shown to include the longitudinally extending guide rib 43 as well as an embossed area 49 on the front surface 46 thereof, which may include the vehicle model identification for personalizing the visor. Although the visor 20 of the present invention is shown as a front window fixed auxiliary visor, it can be a primary visor with the pivot rod 24 being mounted to conventional mounting brackets to allow its releasable movement from the front window to side window position, while allowing the extendable panel 40 to be employed. Thus, with the system of the present invention, an inexpensive, rattle-free extendable visor is provided with an appearance that conforms to the appearance of modern vehicle designs. The sliding fabric-to-plastic interface between panel 40 and visor body 22 assures smooth quiet operation while holding the panel 40 in a desired selected extended position.

It will become apparent to those skilled in the art that various modifications to the preferred embodiment of the invention as described herein can be made without departing from the spirit or scope of the invention as defined by the appended claims.

The invention claimed is:

1. A visor having an extendable panel, said visor comprising:
   a visor body integrally molded of a polymeric material including a guide track for slidably receiving an extendable panel;
   an extendable panel comprising a polymeric core; and
   an upholstery covering for said extendable panel, said covering engaging the polymeric guide track of said body.

2. The visor as defined in claim 1 wherein said visor body includes a longitudinally extending groove formed therein and wherein said extendable panel includes a longitudinally extending rib slidably fitted within said groove.

3. The visor as defined in claim 2 wherein said visor body guide track comprises a generally U-shaped channel extending on at least opposite edges thereof and open on at least one end for receiving said extendable panel.

4. The visor as defined in claim 3 wherein said core has a peripheral edge covered by said upholstery, said edge having a thickness less than a central area of said extendable panel to allow said edge to slidably extend within said U-shaped channel.

5. The visor as defined in claim 4 wherein said extendable panel is a laminate comprising a core, sheets of adhesive film on opposite sides of said core and upholstery covering on opposite sides of said adhesive film from said core.

6. The visor as defined in claim 5 wherein said visor body includes a generally U-shaped channel extending around three edges thereof.

7. The visor as defined in claim 6 wherein said visor body integrally includes a visor rod.

8. The visor as defined in claim 7 wherein said visor rod is coupled to said visor body by means of a flange.

9. The visor as defined in claim 8 wherein said core of said extendable panel is made of PET.

10. A visor having an extendable panel, said visor comprising:
    a visor body including spaced-apart guide channels for receiving an extendable panel;
    an extendable panel comprising a polymeric core formed to include guide edges on at least two opposite sides thereof for extending into said channels; and
    an upholstery covering for said auxiliary panel, said covering applied to opposite sides of said core and having a thickness to allow said guide edges of said panel to slide within said guide of said visor body, with said upholstery covering engaging said channels.

11. The visor as defined in claim 10 wherein said visor body includes a longitudinally extending groove formed therein and wherein said extendable panel includes a longitudinally extending rib slidably fitted within said groove.

12. The visor as defined in claim 11 wherein said guide channels comprise a generally U-shaped channel extending on at least opposite edges of said visor body and open on at least one end for receiving said extendable panel.

13. The visor as defined in claim 12 wherein said extendable panel is a laminate comprising a core, sheets of adhesive film on opposite sides of said core and upholstery covering on opposite sides of said adhesive film from said core.

14. The visor as defined in claim 13 wherein said U-shaped channel extends around three edges of said visor body.

15. The visor as defined in claim 14 wherein said visor body integrally includes a visor rod.

16. The visor as defined in claim 15 wherein said extendable panel includes an area for embossing a vehicle model identification.

17. The visor as defined in claim 16 wherein said visor body includes a slot providing a handhold for moving said extendable panel.

18. The visor as defined in claim 10 wherein said upholstery covering is a woven fabric.

19. A visor comprising:
- a visor body integrally molded of a polymeric material and including a guide channel for receiving an extendable panel; and
- an extendable panel having an upholstery covering, said extendable panel slidably mounted to said guide channel of said visor body such that only said upholstery covering engages said guide channel.

20. The visor as defined in claim 19 wherein said extendable panel is a laminate comprising a core, sheets of adhesive film on opposite sides of said core and said upholstery covering on opposite sides of said adhesive film from said core.

21. The visor as defined in claim 20 wherein said guide channel comprises a generally U-shaped channel extending on at least opposite edges of said visor body.

22. The visor as defined in claim 21 wherein said visor body includes a longitudinally extending groove formed therein and wherein said extendable panel includes a longitudinally extending rib slidably fitted within said groove.

23. The visor as defined in claim 22 wherein said visor body integrally includes a visor rod.

\* \* \* \* \*